United States Patent [19]

Kimura et al.

[11] Patent Number: 5,682,504
[45] Date of Patent: Oct. 28, 1997

[54] DRIVING TECHNIQUE FOR PRINTHEAD OF THERMAL PRINTER TO IMPROVE PRINT QUALITY

[75] Inventors: Satoshi Kimura, Ome; Yasushi Murai, Fussa, both of Japan

[73] Assignee: Casio Computer Co., Ltd., Tokyo, Japan

[21] Appl. No.: 242,718

[22] Filed: May 13, 1994

[30] Foreign Application Priority Data

May 18, 1993 [JP] Japan ................... 5-115785
Jun. 30, 1993 [JP] Japan ................... 5-161571

[51] Int. Cl.$^6$ ........................................ G06K 15/00
[52] U.S. Cl. ................ 395/104; 347/180; 347/182; 347/5; 347/9
[58] Field of Search .................. 395/104, 101, 395/109; 347/171, 180–182, 188, 5, 9, 60, 61; 346/76.1; 358/503; 371/902, 225, 184

[56] References Cited

U.S. PATENT DOCUMENTS

| | | | |
|---|---|---|---|
| 4,407,003 | 9/1983 | Fukui | 346/76 PH |
| 4,510,505 | 4/1985 | Fukui | 346/76 PH |
| 4,638,332 | 1/1987 | Sakura et al. | 347/174 |
| 4,639,741 | 1/1987 | Inoue | 347/182 |
| 4,639,743 | 1/1987 | Sakura et al. | 347/172 |
| 5,038,154 | 8/1991 | Yamamoto et al. | 347/180 |
| 5,115,255 | 5/1992 | Kobayashi et al. | 347/180 |
| 5,248,995 | 9/1993 | Izumi | 347/180 |

*Primary Examiner*—Dwayne Bost
*Assistant Examiner*—Tracy M. Legree
*Attorney, Agent, or Firm*—Frishauf, Holtz, Goodman, Langer & Chick

[57] ABSTRACT

A printing apparatus is provided with a thermal head which has a plurality of heatable elements disposed in a line and divided into plural groups. A control unit controls the plural groups of heatable elements in accordance with printing data to generate heat to thermal-transfer ink of an ink ribbon onto a label tape, thereby printing the printing data on the label tape. A boundary heatable element within one group of heatable elements which is disposed adjacently to other group of heatable elements is driven in accordance with the printing data when the other group of heatable elements are driven to generate heat. The boundary heatable element generates heat twice to prints data twice on the label tape at a portion corresponding to the boundary between two groups of heatable elements, there by printing data on the portion with higher printing intensity. Further, while controlling the thermal head to generate heat, the control unit controls a stepping motor to advance the label tape in synchronism with heat generation by the thermal head, wherein the printing data are printed in elliptical patterns in a tape running direction.

17 Claims, 14 Drawing Sheets

TL : TIME DURATION IN WHICH TAPE IS ADVANCED
▨ : TIMING AT WHICH MOTOR ROTATES
　　　　　　　　　TO TRANSPORT TAPE

: PRINTED FIRST LINE-DATA

: PRINTED SECOND LINE-DATA

PRINT MISSING LINE

DRIVING TECHNIQUE FOR PRINTHEAD OF THERMAL PRINTER TO IMPROVE PRINT QUALITY

BACKGROUND OF THE INVENTION

1. Field of the Invention

The present invention relates to a printing apparatus which is provided with a thermal printing head, and more particularly to a printing apparatus which is provided with a thermal printing head that has a plurality of heatable printing elements disposed in a line and divided into several groups, and which successively heats groups of heatable printing elements to perform a printing operation.

2. Description of the Related Art

Printers employing a serial-thermal head are widely used in conventional printing apparatus such as label printers.

In general, a character to be printed (printing character) is composed of a font pattern of M dots long and N dots broad, where M=N. The serial-thermal head used in conventional label printers includes a plurality of heatable printing elements (for example, for printing M dots) which are disposed in a line in a longitudinal direction. In such conventional label printers using the serial-thermal head, to print a series of characters on a printing medium, e.g., a label tape, the plurality of heatable printing elements are driven to heat in correspondence with one longitudinal-line printing data of a character, and the label tape is advanced by a length corresponding to one dot of the character in the lateral direction of the character, i.e., in a direction of a length of the label tape, thereby one longitudinal-line printing data is thermally printed on the label tape through an ink ribbon. Repeating the above operations, the label printer thermally prints the font patterns of characters on the label tape.

In the above described label printer using a serial-thermal head, each of the heatable printing elements of the serial-thermal head is supplied with electric current in accordance with the printing data. Since a number of heatable printing elements are installed in the serial-thermal head, much of electric power is consumed to heating these heatable printing elements. In simple printing apparatus such as label printers with a dry-battery power source, a battery life of the dry battery is comparatively short because the electric capacity of the battery is comparatively small. In particular, when many font patterns to be painted blackly are supplied to the serial-thermal head as printing characters, i.e., when all the heatable printing elements of the serial-thermal head are simultaneously driven to heat to the maximum heat level to print such font patterns, an abrupt voltage drop will be invited in the battery power source, resulting in much power consumption of the dry battery.

To avoid the above drawback, a so called separate printing system has been proposed. More specifically, in the separate printing system, the plurality of heatable printing element disposed in a line are divided into plural groups and these groups of heatable printing elements are successively driven to print one longitudinal-line printing data or one main scanning-direction line-data. In the separate printing system, the above mentioned abrupt voltage drop is avoided in the battery voltage, and, as a result, a long battery life is expected.

The printing apparatus of the separate printing system, however, encounters another problem as described below.

Now, let us assume that, as shown in FIG. 14, eight heatable printing elements of the serial-thermal head disposed in a longitudinal line are divided into top four printing elements (first to fourth heatable printing elements) and bottom four printing elements (fifth to eight heatable printing elements), and these top and bottom four printing elements are successively and separately driven to print a top separated area and a bottom separated area, respectively, in the separate printing system. When a printing font pattern bridges the top separated area and a bottom separated area, all the top four printing elements are driven at first timing, and all the bottom four printing elements are driven at second timing.

In the separate printing system, the fourth and fifth heatable printing elements on the border between the top and the bottom separated areas are less affected thermally by the adjacent heatable printing elements as compared when all the eight heatable printing elements are driven simultaneously, because heatable printing elements on both sides of the fourth and fifth heating elements are not driven but those only on one side are driven. In this case, only the third or the sixth heatable printing element is driven together with the fourth or fifth heatable printing element. Accordingly, the fourth and fifth heatable printing elements can not generate heat enough for a thermal-transfer printing operation in the separate printing system. It will be observed in FIG. 15 that deterioration in the printed density appears in the printed resultant obtained in the separate printing system at a portion corresponding to the border of the separated areas. That is, poor printed stripe-lines, which appear rather in white, run in the printed resultant in a horizontal direction as shown in FIG. 15. As described above, the separate printing system has an inherent drawback that can not obtain a printed resultant of a high printing quality.

In the simple printing apparatus such as label printers, the thermal head is depressed onto a platen so as to resiliently hold a label tape and an ink ribbon therebetween. The heatable printing elements of the thermal head are driven in accordance with the separate printing system using printing data to melt and transfer ink on the ink ribbon onto the label tape. Every time one scanning-direction line-data of the printing data has been printed on the label tape, the platen is driven by an electric motor to advance the label tape and the ink ribbon by a predetermined distance for printing the following scanning-direction line-data. Printing operations are repeatedly performed in the above described manner, thereby the printing data are printed. For example, in the case the thermal head has six heatable printing elements, these six heatable printing elements are divided into two groups (a group I and a group II) as shown in FIG. 16. The heatable printing elements belonging to the group I are driven at first and then the printing elements belonging to the group II are driven, thereby one line-data are printed on the label tape at an imaginary line represented by a. Then, the label tape is advanced by a predetermined distance with respect to the thermal head such that the thermal head faces an imaginary line represented by b on the label tape. Similarly, heatable printing elements belonging to the groups I and II are successively and separately driven to print the following one line-data on the label tape at the imaginary line b. The printing operations are repeatedly performed in this manner to print printing data.

Further, in conventional label printers, since a voltage drop is caused in the battery power source when the heatable printing elements of the thermal head are driven for the printing operation, the voltage level of the power source is detected, and a pulse duration of a pulse signal to be supplied to the heatable printing elements is adjusted based on the detected voltage level such that the amount of heat is generated enough for the printing operation.

As described above, the conventional printing apparatus is provided with an adjusting unit for adjusting the amount of heat generated by the heatable printing elements of the thermal head in response to variations in the power source voltage. Meanwhile, since a period for printing one line-data is previously fixed, i.e., since a time duration assigned to the printing operation for printing one line-data is limited, the amount of heat enough for the heatable printing operation sometimes can not be generated even though a pulse signal of the maximum pulse duration in a pulse wide table is supplied to the printing elements of the thermal head when the power source voltage is dropped due to power consumption. As a result, as shown in FIG. 17, the diameter of printing dots printed on the label tape decreases for lack of the amount of heat, and non printed portions appear between the adjacent printed dots in a sub-scanning direction (i.e., in a direction in which the label tape is advanced). In particular, in case of a character of a pattern to be painted in black, these non printed portions become prominent, and the character is printed unevenly with poor printing quality.

SUMMARY OF THE INVENTION

The present invention has been made to overcome the above mentioned drawbacks, and has an object to provide a printing apparatus of the separate printing system, which realizes a high printing quality.

A further object of the present invention is to provide a printing apparatus with a battery power source, which realizes a high printing quality even if voltage of the battery power source drops.

Another object of the present invention is to provide a simple printing apparatus with a battery power source, which consumes less power source for the printing operation.

An additional object of the present invention is to provide a printing apparatus of a high speed printing operation.

A further object of the present invention is to provide a printing apparatus which can be used for a label printers.

According to one aspect of the invention, there is provided a printing apparatus which comprises:

a printing medium;

input means for inputting printing data which includes a plurality of line-data;

a thermal head having a plurality of heatable elements, for generating heat when driven, said heatable elements being disposed in a line and divided into plural groups;

printing means for successively driving the plural groups of heatable elements of said thermal head in accordance with the line-data of the printing data input by said input means, to print said line-data of the printing data on said printing medium; and heat control means for controlling a boundary heatable element within a group of heatable elements, which boundary heatable element is disposed adjacently to other group of heatable elements, in accordance with the line-data of the printing data input by said input means, so as to generate heat when said other group of heatable elements are driven to generate heat.

According to another aspect of the present invention, there is provided a printing apparatus which comprises:

a printing medium;

input means for inputting printing data which includes a plurality of line-data;

a thermal head having a plurality of heatable elements, for generating heat when driven, said heatable elements being disposed in a line and divided into plural groups;

printing means for successively driving the plural groups of heatable elements of said thermal head in accordance with the line-data of the printing data input by said input means, to print said line-data of the printing data on said printing medium; and transport means for transporting said printing medium by a predetermined distance while said printing means is driving one of groups of heatable elements of said thermal head.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which.

DETAILED DESCRIPTION OF THE PREFERRED EMBODIMENTS

Now, preferred embodiments of the present invention will be described in detail with reference to the accompanying drawings.

First Embodiment

Figure 1:
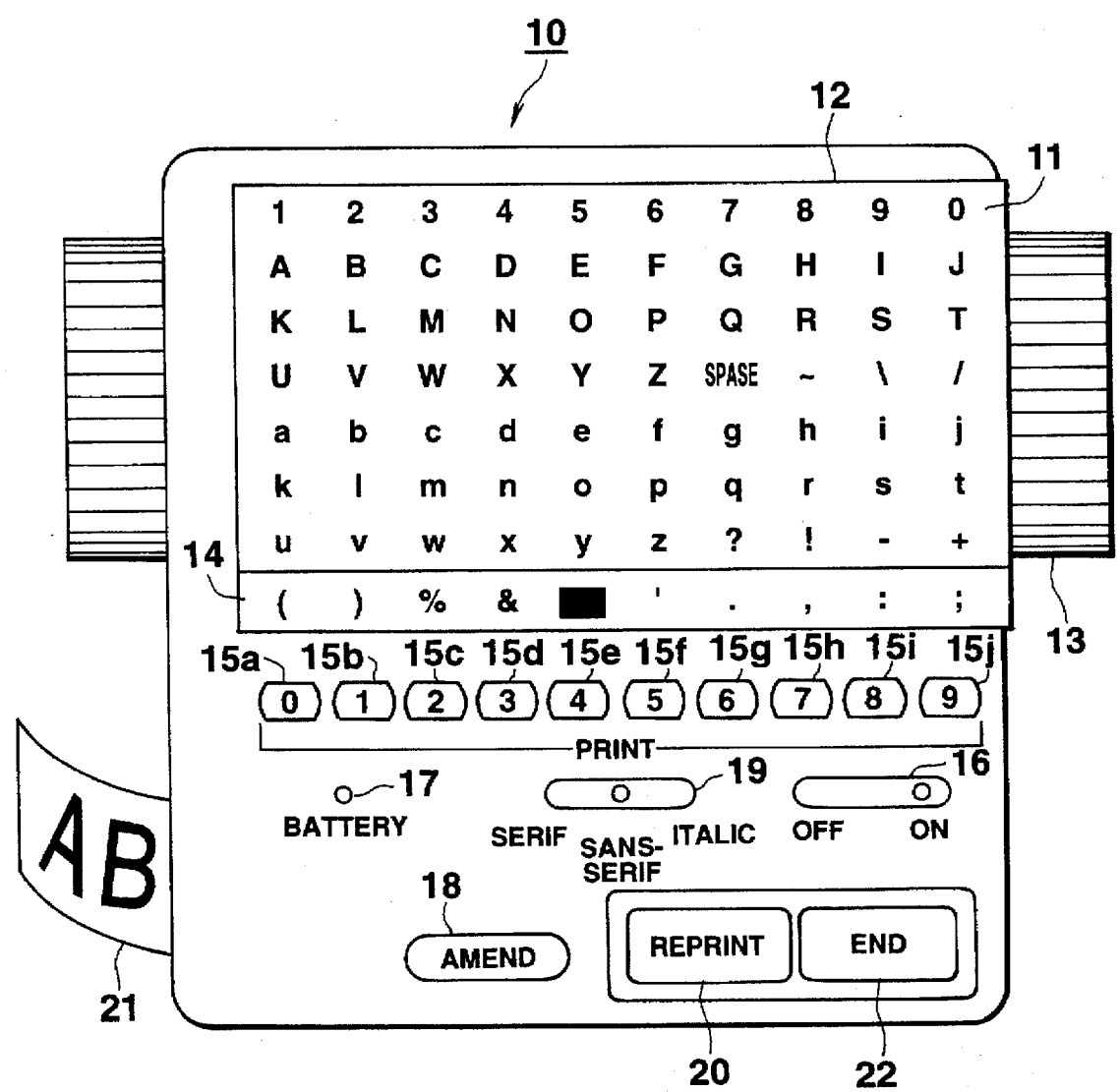
FIG. 1 is an external view of an embodiment of a label printer according to the present invention.

FIG. 1 is an external view of a label printer incorporating the printing apparatus according to the present invention.

The label printer 10 is equipped with a cylindrical data-drum 11. On a surface of the cylindrical data-drum 11 are printed characters and symbols including alphabets, numerics and icons. These characters and symbols are printed on the surface of the cylindrical data-drum in an matrix arrangement so as to form 32 rows in a rotational direction of the data-drum 11 and 10 columns in an axial direction thereof. Characters and symbols printed in one row (8-th row in the present embodiment) on the data drum 11 are displayed through a drum window 12.

The data-drum 11 is provided with row-selecting knobs 13, which extend from side walls of the printer housing 10. A user can select a row printed on the data-drum 11 by rotating the row-selecting knob 13. The selected row can be seen through a data-selecting window 14 provided at the lower portion of the drum window 12. Ten column-selecting keys 15a–15j are provided on a front surface of the printer 10 along the data-selecting window 14. By operating the column-selecting keys 15a–15j, the user can select and designate one of characters in the row displayed through the data-selecting window 14.

In short, the data-drum is provided with a switch structure therein. The switch structure combined with column-selecting keys 15a–15j serves as key switches of a matrix arrangement corresponding respectively to characters and symbols printed on the data-drum 11.

On the front surface of the printer 10 are provided a power ON/OFF switch 18, a battery indicator 17 for alarming battery consumption, an amendment key 18, a font-changing key 19, a re-printing key 20 and an end key 22. The battery indicator 17 alarms when battery power has decreased. The amendment key 18 is operated when the character is amended which has been selected by operation of the row-selecting knob 13 and the column-selecting keys 15a–15j. The font-changing key 19 is operated to select or designate "serif", "sans-serif", "italic" and so on. The re-printing key 20 is used to print data up to 32 characters again which have been printed and stored last in a printing RAM of the printer 10. The end key 22 is further provided, and, when operated, a printing operation is finished.

A tape cassette is installed in a tape cassette receiving portion (not shown) of the printer 10. The tape cassette includes an ink ribbon and a label tape 21 or a printing tape, on which data are printed. The label tape 21 on which data have been printed is fed out from an outlet (not shown) on the side wall of the printer housing 10 through a tape cutting mechanism (not shown). The label tape 21 is guided to as to be stacked on the ink ribbon at a predetermined position within the tape cassette, and, when the tape cassette installed in the printer body, the label tape 21 and the ink ribbon are depressed at the above predetermined position onto a thermal head 42.

A printing mechanism installed within the printer housing 10 employs a serial thermal head which has a plurality of heatable printing elements disposed in a line. More specifically, the plurality of heatable printing elements are divided into plural groups, and the plural groups of heatable printing elements are successively driven to generate heat for printing one main-scanning direction line-data. In the present first embodiment, the thermal head has eight heatable printing elements, and these heatable printing elements are divided into two groups.

In the label printer, the "sans-serif" is designated by operation of the font-changing key 19, and characters "A" to "J" in the second row on the data-drum 11 are selected by rotation of the knob 13 and are displayed within the data-selecting window 14. Further, the character "A" is designated by operation of the column-selecting key 15a. Then, a font pattern "A" of the designated character "A" is read out from a (sans-serif) area of the second row and the first column of a font ROM, and is printed on the label tape 21 by the printing mechanism.

Characters on the data-drum 11 are displayed within the data-selecting window 14 and one of them is selected by every operation of one of the column-selecting keys 15a–15j, and a font pattern of the selected character is printed on the label tape 21.

When a wrong character is selected and printed in error by operation of the row-selecting knob 13 and the column-selecting keys 15a–15j, for example, when "ABD" are selected in place of desired characters "ABC", the label tape 21 up to a portion where the wrong characters (in this case "ABD") have been printed is cut separated by a tape cutting mechanism 59 by operation of the "amendment" key 18. And at the same time, only a last entered character (in this case, a character "D") of data which have been stored as printed data in the printing RAM is deleted, and all the characters ("AB") of the data except the last entered one ("D") are newly printed on the label tape 21.

In this case, another correct character ("C") may be designated in place of the character ("D") selected in error.

Figure 2:
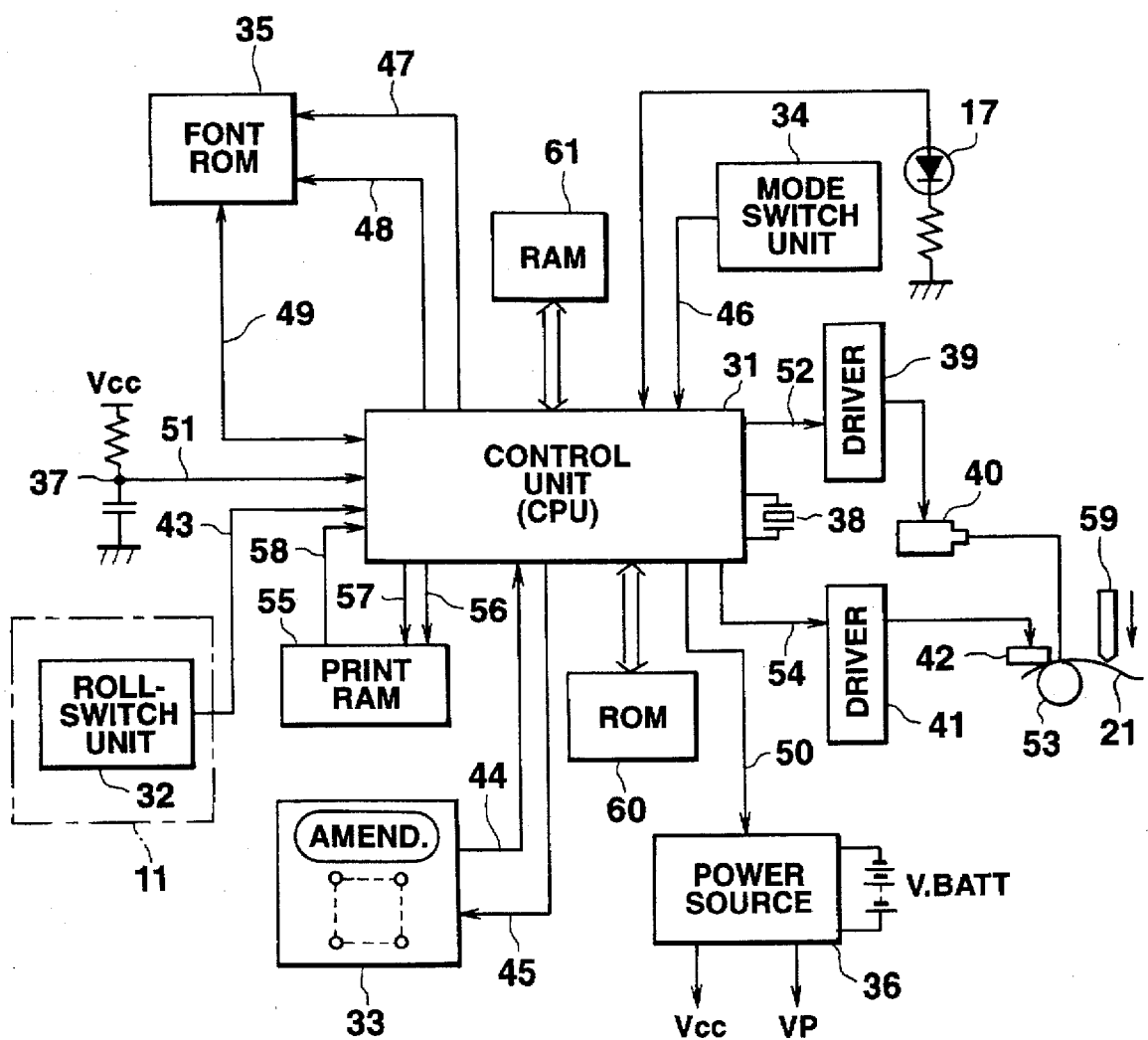
FIG. 2 is a block diagram of an electronic circuit of the label printer.

FIG. 2 is an electronic circuit diagram of the above label printer.

In the label printer, a central processing unit (CPU) 31 controls operation of peripheral circuits connected thereto. The CPU 31 is provided with a read only memory (ROM) 60 and a random access memory (RAM) 61. In the ROM 60 is memorized a program which regulates operation of the CPU 31. The RAM 61 stores predetermined fixed data, and is assigned with a work area. The CPU 31 is connected with a roll-switch unit 34 connected to the data drum 11, a key-input unit 33, a mode-switch unit 32, a font ROM 35, a power supply 36, a reset-signal generating unit 37, an oscillator 38, a battery indicator 17. Further, the CPU 31 is connected with a stepping motor 40 through a motor driver 39 and the thermal head 42 having eight heatable printing elements through a head driver 41.

The roll-switch unit 32 is used to detect one row (data row) of 32 rows on the data drum 11 which is selected and displayed within the data-selecting window 14 by operation of the row-selecting knob 13, and sends a roll-switch signal 43 to the CPU 31.

The key-input unit 33 includes the column-selecting keys 15a–15j, the amendment key 18, the re-printing key 20 and the end key 22. A key-out signal 44 is sent from the key-input unit 33 to the CPU 31. A key-in signal 45 is sent from the CPU 31 to the key-input unit 33.

The mode switch unit 34 includes the power switch 16 of the printer 10 and the font-changing key 19. A mode switch signal 46 is sent from the mode switch unit 34 to the CPU 11.

In the font ROM 35 are stored font patterns of "serif", "sans-serif" and "italic" for characters and symbols described on the data drum 11. A reading control signal 47 is sent from the CPU 11 to the font ROM 35. A read address is transferred via an address bus 48 and a read out font pattern is transferred through a data bus 49.

The power supply 36 receives a power control signal 50 from the CPU 11. When the power switch 16 is turned on, power of a predetermined voltage is supplied to various circuits and a reset signal 51 is sent from the reset-signal generating circuit 37 to the CPU 11, initializing the same.

A motor control signal 52 is sent from the CPU 11 to the motor driver 39, rotating the stepping motor 40 every time one longitudinal dot-line data of a font pattern to be printed (printing font pattern) has been printed. Then, the stepping motor 40 rotates a platen 53 to feed the label tape 21 by a length corresponding to a distance between laterally disposed adjacent dots of the printing font pattern.

The CPU 31 sends a thermal-head control signal 54 to the head driver 41, and thereby the thermal head 42 is driven to generate heat, for example, in accordance with a top/bottom (or an upper/lower) separate printing system.

When one longitudinal dot-line data of a font pattern is printed, the first to the fourth heatable printing elements of the thermal head 42 are driven at the first timing, which elements correspond respectively to dot data of an upper half (1st–4th dot) of the one dot-line data, and the fourth to the eighth heatable printing elements of the thermal head 42 are driven at the second timing, which elements correspond respectively to dot data of lower half (4th–8th dot) including 4th dot on the boundary of the upper half and the lower half of the one dot-line data.

In other words, one longitudinal dot-line data of the printing font pattern are divided into two groups, and the upper half dot-line data (1st–4th dot) are printed at the first timing and then another half dot line data (4th–8th dot) including dot data of the upper half dot-line data are printed at the second timing. It should be noted that the 4th dot on the boundary of the upper half and the lower half of the dot-line data is printed twice, i.e., the 4th dot is printed twice at the first and the second timings.

A print RAM 55 is connected to the CPU 31. The print RAM 55 successively stores font patterns of up to 32 characters which are read out from the font ROM 35 and are printed in accordance with the roll-switch signal 43 of the roll-switch unit 32 and the key out signal 44 of the column-selecting keys 15a–15j. All the font patterns which have been printed and stored in the print RAM 55 are read out therefrom and printed again in response to operation of the reprinting key 20. When the amendment key 18 is operated, only the font pattern of the last entered data is deleted and remaining font patterns are read out and printed again.

All the font patterns stored in the print RAM 55 are cleared by operation of the end key 22.

A read/write control signal 56 is sent from the CPU 11 to the print RAM 55 to control a read/write operation of the print RAM 55. A read/write address is transferred through an address bus 57 to the print RAM 55 and read/write data is transferred through data bus 58 to the CPU 11.

In the vicinity of a position on the printer housing 10 where the label tape 21 is separated from the platen 53 is installed the tape cutting mechanism 59. The tape cutting mechanism 59 cuts off the printed label tape 21 in response to operation of the amendment key 18 and the end key 22.

Now, operation of the label printer with the above mentioned structure will be described in detail.

When a user of the label printer 10 wants to make a label of "A B C", the user operates the row-selecting knob 13 to rotate the data drum 11 so as to display characters "A", "B", "C" to "J" in the second row within the data-selecting window 14, and designates the character "A" at the first column by operating the column-selecting key "0" 15a. Then, the roll-switch signal 43 of a first-row designating signal is sent from the roll-switch unit 32 to the CPU 31, and a font pattern "A" is selected and read out from the font ROM 35 in accordance with the roll-switch signal 43 and the key out signal 44 of the column-selecting key "0" 15a in the key-input unit 33. The read out font pattern "A" is sent to thermal head 42 and the longitudinal dot-line data of the font pattern "A" are successively printed on the label tape 21 in a thermal-transfer printing fashion.

The label tape 21 is advanced in a lateral direction by a length corresponding to a dot interval by means of the platen 53 driven by the stepping motor 40 in synchronism with a printing process for printing one longitudinal dot-line data.

A series of character data (a series of character fonts) which have been printed are read out from in the print RAM 55 to the CPU 31. A character font "A" which has been printed last is added to the end of the above series of previously printed character data, and a series of character data including the added character font are stored in the print RAM 55 again as a series of printed characters which have been printed.

In this case, since the last printed character font "A" is an initial printing data, the character font "A" is stored at the leading position in the print RAM 55.

When the characters "A", "B", "C" to "J" in the second row of the data drum 11 are displayed in the data-selecting window 14, the user designates the second character "B" at the second column by operating the column-selecting key "1" 15b. Then, the roll-switch signal 43 of a second-row designating signal is sent from the roll-switch unit 32 to the CPU 31, and the font pattern "B" is selected and read out from the font ROM 35 in accordance with the roll-switch signal 43 and the key out signal 44 of the column-selecting key "1" 15b in the key-input unit 33. The read out font pattern "B" is sent to the thermal head 42, and the longitudinal dot-line data of the font pattern "B" are successively printed on the label tape 21 in the thermal-transfer printing fashion.

Printed character data (character font "A") stored in the print RAM 55 is read out to the CPU 31. The last printed character font "B" is added to the previously printed character data "A", and the character data "A" and "B" are stored as the printed character data in the print RAM 55 again.

Now, the character fonts "A" and "B" have been successively stored in the print RAM 55.

Next, a character data "C" on the data drum 11 should be selected and printed in a similar manner, but if a wrong character "D" is designated, a character font "D" at the second row and the fourth column on the data drum 11 is designated and read out from the font ROM 35 in accordance with the roll-switch signal 43 from the roll-switch unit 32 and the key out signal 44 form the key-input unit 33. Longitudinal dot-line data of the read out character font "D" are successively printed on the label tape 21 by means of the thermal head 42 in the thermal-transfer manner.

Printed character data (character fonts "A" and "B") stored in the print RAM 55 are read out to the CPU 31. The last printed character font "D" which has been selected in error is added to the previously printed character data "A" and "B", and the character data "A", "B" and "D" are stored as the printed character data in the print RAM 55 again.

Now, the character fonts "A", "B" and "D" have been successively stored in the print RAM 55.

When the amendment key 18 is operated to amend the character data "A B D" which have been printed in error to character data "A B C", the platen 53 is driven by the motor driver 39 and the stepping motor 40, and thereby the label tape is advanced until a portion thereof on which "A B D" are printed passes by the tape cutting mechanism 59, and the printed portion is cut off.

Only the last character font "D" among the printed character fonts "A", "B" and "D" which have been stored in the print RAM 55 is deleted as a character font which is printed in error.

After the character font "D" has been deleted, character fonts "A" and "B" are successively read out from the print RAM 55 to the CPU 31 in order of "A" and "B", and longitudinal dot-line data of the character fonts "A" and "B" are successively printed through the thermal head 42 on the label tape 21.

In this case, there is no need to select desired character fonts "A B C" from the first again, but the character fonts "A" and "B" which have been entered correctly are printed simply by operation of the amendment key 18 on a fresh portion of the label tape 21.

Therefore, in place of the character "D" printed in error, a correct character "C" is designated by column-selecting operation of the column-selecting keys 15c, and a font pattern of "C" is selectively read out from the font ROM 35 in accordance with the above normal printing process, and further the read out font pattern of "C" is printed on the label tape 21 following the printed correct character fonts "A" and "B".

In this case, printed character data (character fonts "A" and "B") stored in the print RAM 55 are read out to the CPU 31. The character font "C" which has been printed in the last is added to the read out character data "A" and "B", and the character data "A", "B" and "C" are stored as the printed character data in the print RAM 55 again.

Now, character fonts "A", "B" and "C" have been stored in the print RAM 55.

When a series of desired characters "A B C" have been printed on the label tape 21 and the end key 22 is operated, the character fonts "A", "B" and "C" stored in the print RAM 55 are deleted.

And when the end key 22 is operated, the platen 53 is driven by the motor driver 39 and the stepping motor 40, thereby the label tape is advanced until a portion thereof on which "A B C" is printed passes by the tape cutting mechanism 59, and the printed portion is cut off.

Now, a character-selection printing process for printing one main scanning-direction line-data in the above described label printer will be described in detail.

Figure 3:
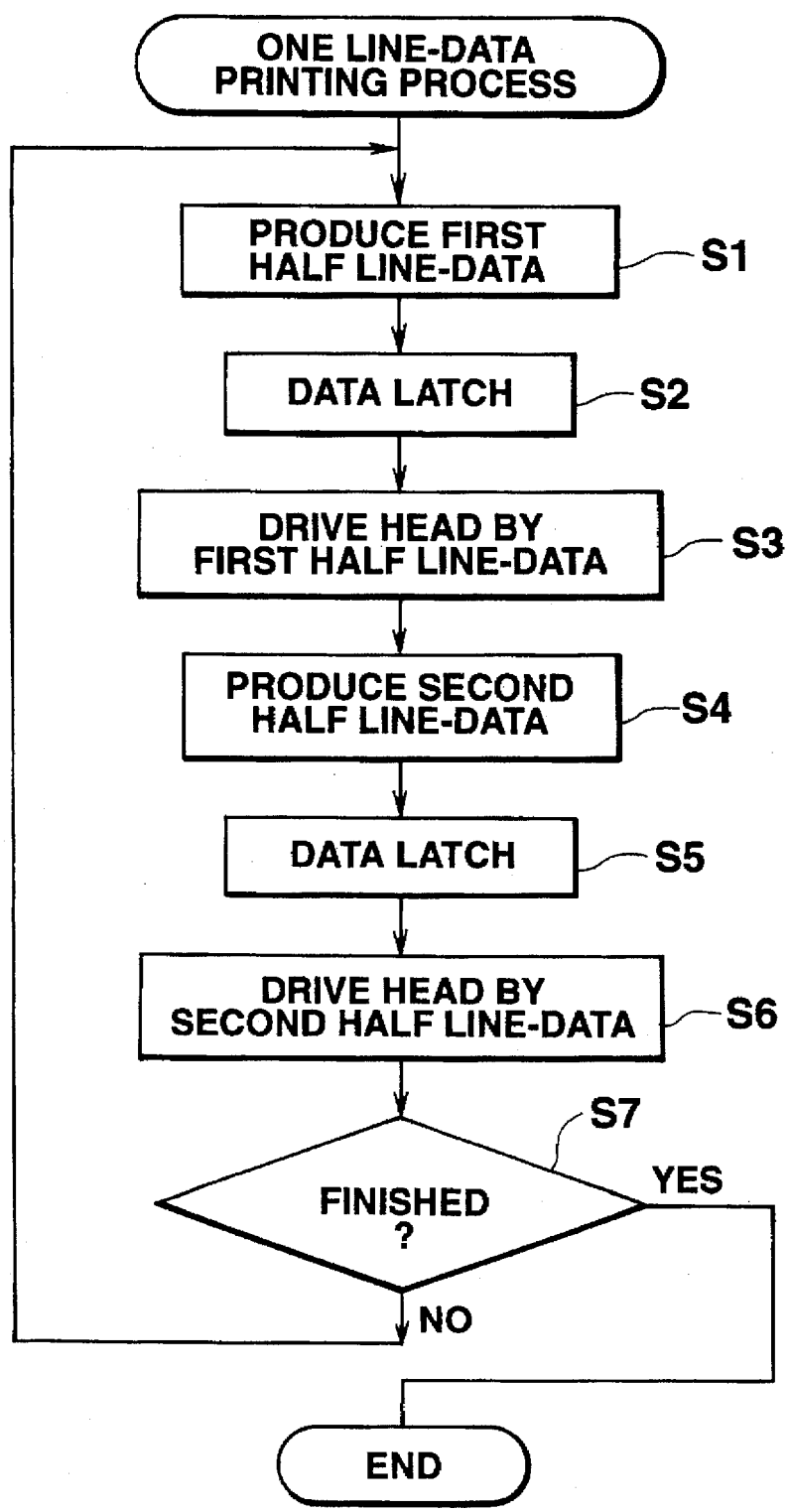
FIG. 3 is a flow chart in a separate-print process for processing to print data of a character arraying in one line in a main scanning-direction of the label printer (one main scanning-direction line-data)

FIG. 3 is a flow chart of the separate printing process for printing one main scanning-direction line-data in the above label printer.

Figure 4:
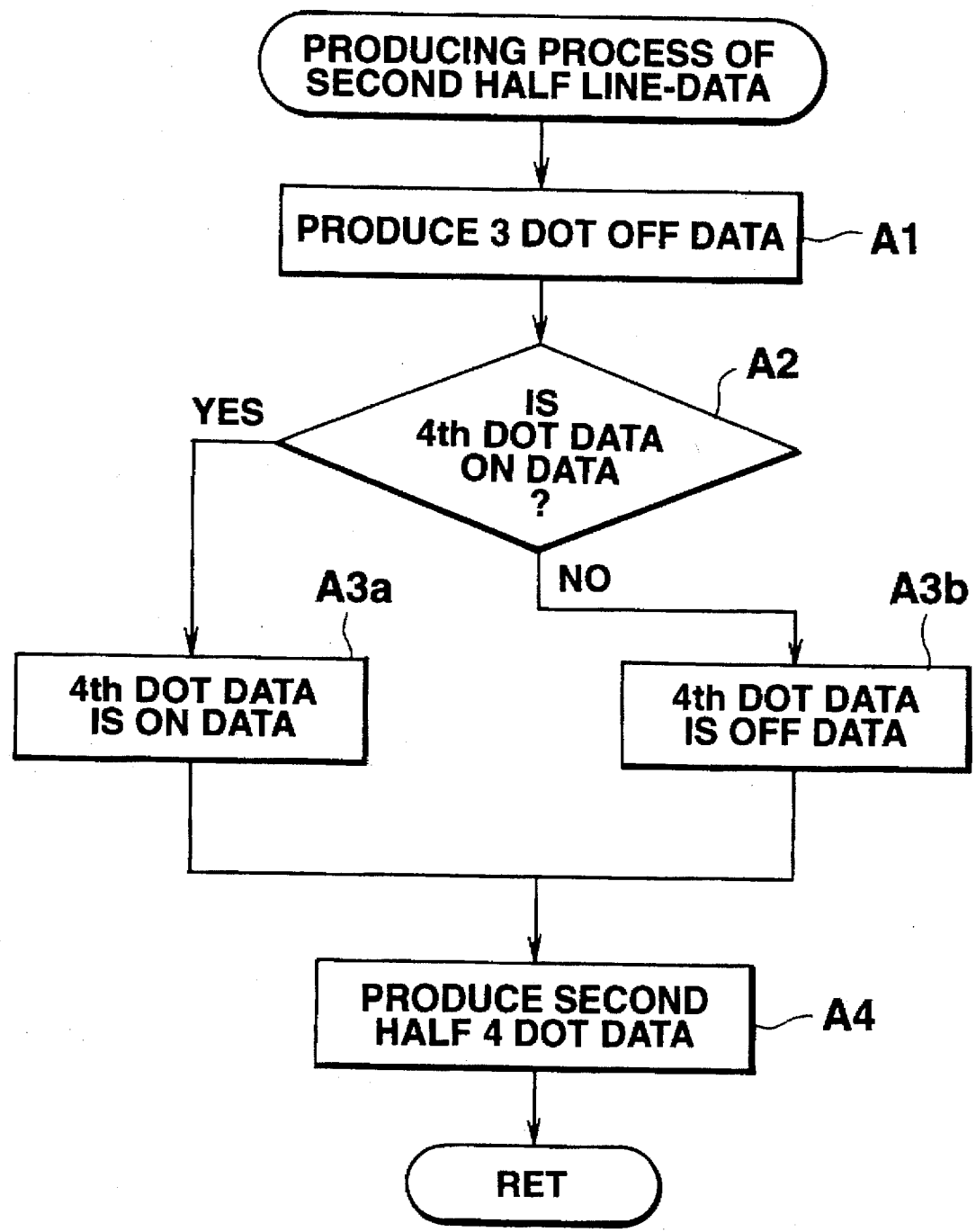
FIG. 4 is a flow chart of a data producing process in the separate-print process for producing second half of one main scanning-direction line-data of a character.

FIG. 4 is a flow chart of second half of the one line-data producing process in the main scanning-direction line-data separate printing process.

Figure 5:
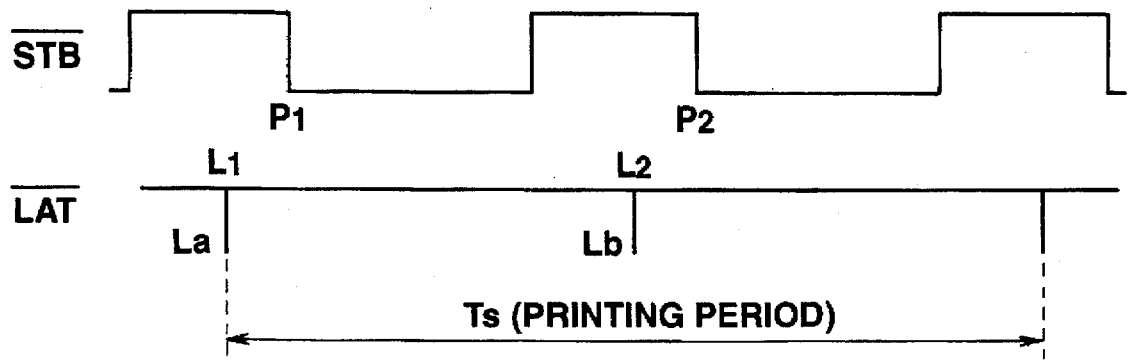
FIG. 5 is a timing chart showing printing a head driving timing and a data latching timing in for processing one main scanning-direction line-data of a character in the separate-print process.

FIG. 5 is a timing chart illustrating a timing of applying an electric current to the printing head and a data-latch timing.

Figure 6:
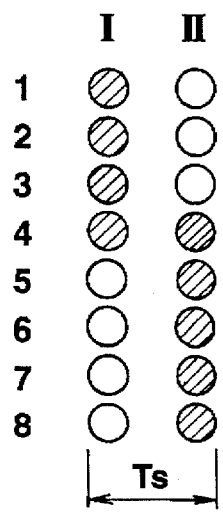
FIG. 6 is a view illustrating a first half driving area and a second driving area for heatable printing elements of a thermal head which is controlled in accordance with the present invention.

FIG. 6 is a view showing a first-half dot-driving area and a last-half dot-driving area in the thermal head 42 of the above label printer.

A printing operation of one printing period Ts will be described with reference to FIGS. 4–6.

More specifically, when, for example, a character to be painted black (a black character) is selected at the eighth row and the fifth column on the data drum 11 in response to the row-column selecting operation of the row-selecting knob 13 and the column-selecting key 15e, the roll-switch signal 43 of an eighth-row designating signal is read out from the roll-switch unit 32 to the CPU 31, and a corresponding black painted font pattern is selected in the font ROM 35 in accordance with the roll-switch signal 43 and the key out signal 44 of the column-selecting key "4" 15e in the key-input unit 33. Then, line-data of the selected font pattern are successively read out from the font ROM 35 to the CPU 31.

Based on printing data of the read out line-data, data (8 dots) are produced by the CPU 31 to be printed at a first printing timing (first-half printing timing). Since the line-data of the black painted font pattern are composed of black dot data, one line-data of a first half is produced which allows an electric current to flow through the first to the fourth dot-heating elements (first to fourth heatable printing elements) and inhibits the electric current from flowing through the fifth to the eighth dot-heating elements (fifth to eighth heatable printing element) (step S1). The above first to eighth dot-heating elements correspond respectively to the first to the eighth dot data in the first-half separated area. The produced printing data is stored in the RAM 61.

At a latch timing L1, a latch pulse La is generated and one line-data of the first half is latched at the head driver 41. Thereafter, a strobe signal STB is generated at a first energizing timing P1, and wherein the first to the fourth dot-heating elements of the thermal head 42 are driven, as shown at I in FIG. 6 in accordance with the first-half line-data which has been latched at the thermal head driver 41 (steps S2, S3).

In other words, only the first to the fourth dot data among 8 dot data of the one line-data composed of black dot data are printed at the first-half printing timing, and then another line-data (8 dots) is produced by the CPU 31 to be printed at a second-half printing timing (step S4).

One line-data (3 dot OFF data) of a second half is produced which inhibits the electric current from flowing through only the first to the third dot-heating elements among the dot-heating elements through which the electric current flows at the first-half printing timing, and it is judged whether the fourth dot data on the boundary between the upper and the lower half separated areas is "ON" data which allows electric current to flow through the fourth dot-heating element (steps A1 and A2 in FIG. 4).

In this case, since it is determined that the fourth dot data printed at the first-half printing timing is "ON" data, data is produced which allows the electric current to flow through the fourth dot-heating element (steps A2 to A3a). The above "ON" data is such data that causes the electric current to flow through the dot-heating element.

Meanwhile, for example, if the fourth dot data printed at the first-half printing timing is "OFF" data, data is produced which prohibits the electric current from flowing through the fourth dot-heating element (steps A2 to A3b). The above "OFF" data is such data that prohibits the electric current from flowing through the dot-heating element.

In correspondence to the fifth dot-data to the eighth dot-data in the second-half separated area, data is produced which allows the electric current to flow through the fifth to the eighth dot-heating elements (steps A4).

In the process of producing one line-data of the second-half separated area, the fourth dot data included in the first-half separated area and disposed on the boundary between the upper and the lower-half separated areas is also included in the second-half separated area. As a result, one line-data of the second-half separated area has been produced which drives the fourth to the eighth dot-heating element in correspondence with the fourth to the eighth dot-data in the one line-data to be printed.

At a latch timing L2, a latch pulse Lb is generated and the one line-data of the second-half separated area is latched at the head driver 41. Thereafter, the strobe signal STB is generated at a second energizing timing P2, and the fourth to the eighth dot-heating elements of the thermal head 42 are driven, as shown at II in FIG. 6, in accordance with the second-half line-data which has been latched at the head driver 41 (steps S5, S6).

When the first longitudinal line-data of the printing font pattern has been printed on the label tape 21 in the above described manner, the label tape 21 is advanced by a length corresponding to one dot interval in a lateral direction thereof.

Thereafter, the second and the third longitudinal line-data of the printing font pattern are successively subjected to the separate printing process to be printed in the main scanning direction in the similar manner (steps S1 to S7).

More specifically, in the case that a printing font pattern is a black painted pattern and all the dot data in individual line-data are black dot data, the first line-data of the first-half separated area is produced, whose first to fourth dot data are black data, and the first line-data of the second-half separated area is produced, whose fourth to eighth dot data are black data.

With the above mentioned structure of the label printer, a desired character indicated on the data drum 11 is selected by operation of the row-selecting knob 13 and the column-selecting keys 15a–15j, and a font pattern corresponding to the selected character is read out from the font ROM 35. The read out font pattern is not simply printed on the label tape 21 through the head driver 41 and the thermal head 42, but line-data (for example, 8 dots) of the font pattern is divided into the upper and lower half data and these upper and lower half data are printed at different timings. The upper half data including the first to the fourth dot data are printed at the first timing and the lower half dot data including the fourth to the eighth dot data are printed at a different timing (at the second timing). In this case, it should be noted that the fourth dot data on the boundary between the upper and the lower halves is printed twice, i.e., at the first and the second timings.

Since it is arranged in the present embodiment that there are not two adjacent dot data in one line-data which are not printed at the same time, there is a timing at which the dot-heating elements on the boundary between the separated areas are driven at the same time, even though the font pattern includes a black portion which bridges over the upper and lower separated areas of the font pattern. Therefore, since some amount of heat is supplied from the adjacent dot-heating element to the dot-heating element on the boundary to compensate lack of heat, thereby dot data on the boundary being printed a little blacker, a print missing portion does not appear on the boundary between the upper and the lower separated areas of the font pattern and a printed pattern of a high printing quality is obtained.

As described in the above mentioned embodiment, with reference to the printing data of the first-half separated area, dot data (fourth dot data) on the boundary between the separated areas is printed twice, that is, the fourth dot data is printed together with the first-half dot data when such first-half dot data are printed and is also printed together with the second-half dot data when such second-half dot data are printed. Meanwhile, dot data to be printed twice may be printed together with the first-half printing data to realize the similar printing quality, that is, the fifth dot data belonging to the second-half printing data is printed for the first time together with the first-half printing data, and then is printed for the second time together with other second-half printing data. Of course, the fifth dot data is printed together with the first-half printing data, only when the fifth dot data is expected to be printed.

Similarly, even if the printing data is separated into several areas, data on the boundary between the separated areas is printed twice either in one separated area or in other separated area.

The embodiment of the present invention has been described which is applied to a so called label printer for printing characters and symbols on a label tape, but the present invention may be applied to ordinary printing machines which print data on a normal printing sheet.

Second Embodiment

Figure 7:
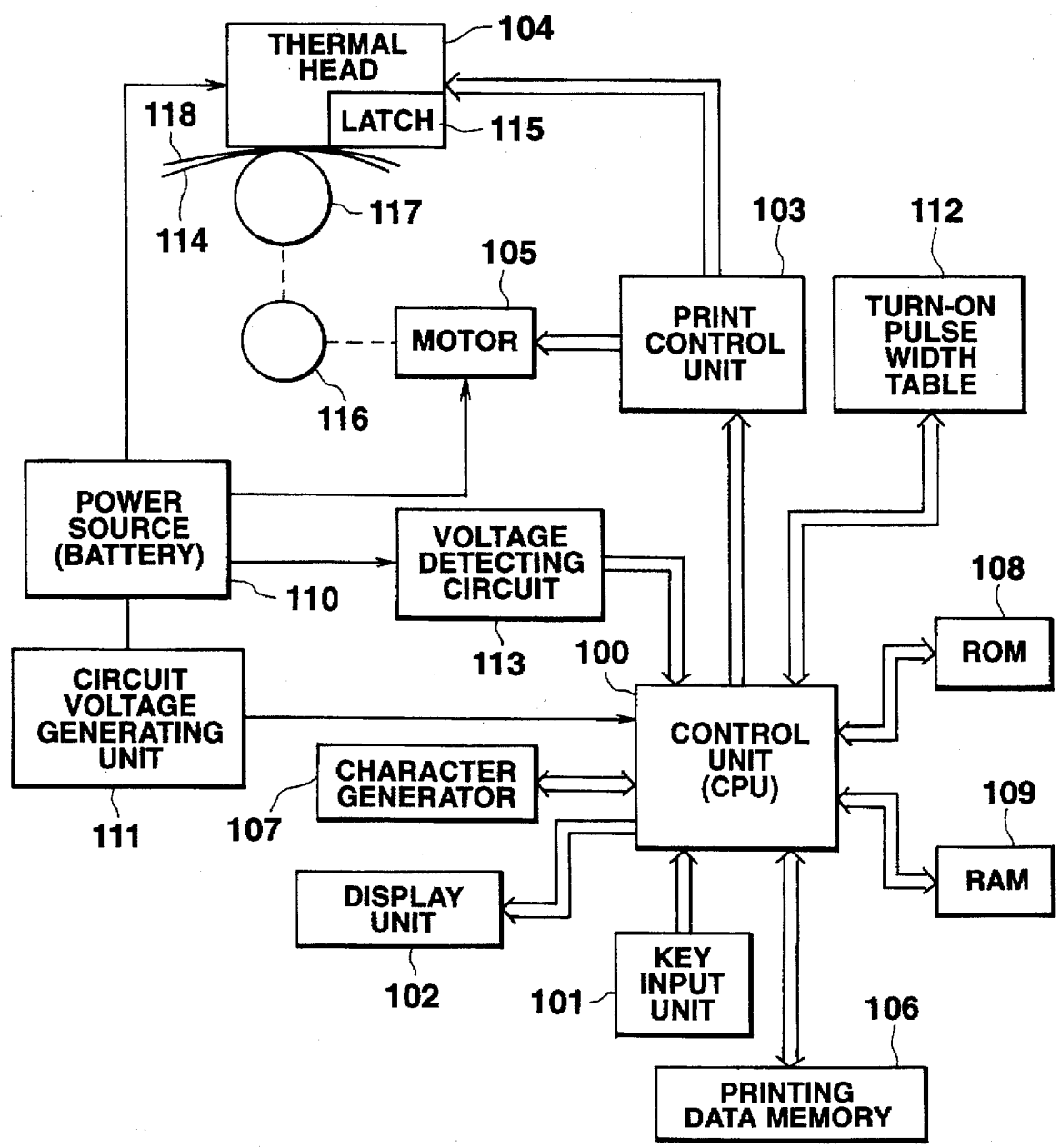
FIG. 7 is a circuit diagram of another embodiment of the label printer of the present invention.

FIG. 7 is a circuit diagram of a second embodiment a label printer according to the present invention.

A control unit (CPU) 100 controls whole operation of electronic circuits of the label printer. The control unit 100 is connected with a key input unit 101 and display unit 102 which displays printing data input through the key input unit 101. Further, the control unit 100 is connected with a print control unit 103, which print control unit 103 is further connected with a thermal head 104 and an electric motor 105 for advancing a tape.

The control unit 100 is further connected with a printing data memory 106, a character generator 107, a read only memory (ROM) 108, a random access memory (RAM) 109, a turn-on pulse width table 112 and a voltage detecting circuit 113.

The printing data memory 106 is for storing data to be printed (printing data), such as characters and symbols which are input through the key input unit 101. The character generator 107 previously stores character fonts correspondingly respectively to all the characters and symbols which can be input through the key input unit 101.

The ROM 108 previously stores system control programs such as a program for controlling generation of printing data and a print control program. The control unit 100 controls various operations of the label printer in accordance with the system control program.

A reference number 110 denotes a power source battery and 111 represents a circuit voltage generating unit for supplying the control unit 100 with a power voltage.

In accordance with a control program stored in the ROM 108, the control unit 100 controls through the print control unit 103 timings of starting and/or stopping driving of the thermal printing head 104 and timings of starting and/or stopping of the stepping motor 105 to advance a label tape (a medium on which printing data is to be printed) 114. The timing of energizing the thermal printing head 104 is controlled in accordance with a turning-on pulse width which is set in the turning-on pulse width table 112 based on a voltage level of the power source battery 110 detected by the voltage detecting circuit 113.

The thermal printing head 104 is provided with, for example, 6 heatable printing elements disposed in a line. A character data to be printed, i.e., printing character data, is composed of, for example, plural line-data each including 6 dots disposed in a line, which 6 dots are grouped into a first printing line-data (first 3-dot data) and a second printing data (second 3-dot data). The thermal printing head 104 separately receives the first 3-dot data and the second 3-dot data of the printing character data, thereby driven to generate heat twice. The thermal printing head 104 is also provided with a latch unit 115 for holding the line-data of the printing character data transferred from the control unit 100 through the print control unit 103.

The turning-on pulse width table 112 holds table data having a turning-on pulse width which allows electric current to flow through the thermal printing head 104 to generate heat enough to realize even and clear printing in accordance with a voltage level of the power source battery 110 detected by the voltage detecting circuit 113, in a printing operation of the thermal printing head 104. The turning-on pulse width data set in accordance with the turning-on pulse width table 112 controls an energizing time during which electric current flows through the heat generating elements of the thermal printing head 104.

The stepping motor 105 is connected to a platen 117 through a reduction gear train 116. The platen 117 rotates at a predetermined reduction ratio in response to the rotation of the stepping motor 115.

The platen 117 depresses the label tape 114 and an ink ribbon 118 both received in a tape cassette (not shown) onto the thermal printing head 104, when the tape cassette is installed in the label printer. The label tape and the ink ribbon are advanced by a predetermined length by the stepping motor 105 in the printing operation.

The stepping motor 15 has four-phase exciting-electrodes, and advances the label tape 114 in a sub scanning-direction by a distance corresponding to a pitch of main scanning-direction line-data (a printing line pitch) relatively to the thermal printing head 104 in one exciting step in each phase.

In this case, we assume that the label tape 114 stays in a position in which the first printing line on the label tape 114 meets the thermal printing head 104, right after the first phase exciting electrode has been excited. When the first and second phase exciting electrodes are simultaneously excited, i.e., when a two-phase exciting control is performed, the label tape 114 advances by half a printing-line pitch and takes a position between the first and the second printing lines. When the first phase exciting electrode is released and only the second phase exciting electrode is excited, i.e., when a one-phase exciting control is performed, the label tape 114 further advances by another half a printing-line pitch to take a next position where the second printing line on the label tape meets the thermal printing head 104. In other words, the stepping motor 105 is excited in accordance with the one and two phase exciting controls, and every phase exciting control rotates the platen 117 by a predetermined angle, thereby the label tape 114 by being advanced by half a printing line pitch.

When a character data is printed by the thermal 6-dot printing head 104 in accordance with the two separated area printing system (two 3-dot data are printed separately), the first 3-dot data of the printing character data is output to be printed and the label tape 114 is advanced by half a printing-line pitch by the stepping motor 105. Then, another 3-dot data of the printing character data is output to be printed and the label tape 114 is further advanced by another half of one printing-line pitch by the stepping motor 105.

In the first-half separated area, the printing data are printed on the label tape 114 from the first printing line to an intermediate position between the first printing line and the second printing line. And in the second-half separated area, the printing data are printed on the label tape 114 from the intermediate position to the second printing line. Furthermore, in the next first-half separated area, printing data are printed on the label tape 114 from the second printing line to an intermediate position between the second printing line and a third printing line. And in the next second-half separated area, printing data are printed on the label tape 114 from the intermediate position between the second printing line and the third printing line to the third printing line.

More specifically, in the separate printing system of the label printer according to the present invention, one line-data printing period is defined by a time interval between the first printing operation for printing the first main scanning-direction line-data by means of all the heatable printing elements of the thermal printing head 104, and the second printing operation for printing the second main scanning-direction line-data similarly. The label tape 114 is advanced finally by a length corresponding to a printing-line pitch in one line-data printing period, but to print printing data in each of the separated areas, the label tape 114 is advanced by a length corresponding to a quotient obtained by dividing the printing-line pitch by the number of separation of printing data. Further, the label printer of the present invention has a feature that advances the label tape at the timing of the printing operation by the thermal printing head.

In the present embodiment, the printing operation for printing data in two separated areas has been described, but the printing data may be divided, for example, into four separated areas and the reduction ratio of the reduction gear train 116 may be adjusted such that the label tape is advanced by one fourth of the line-printing pitch.

The voltage detecting circuit 113 detects voltage levels of the power battery 110 every time when a predetermined time Tc lapses after energizing the thermal printing head 104 for printing data in the first and the second separated areas. Depending on the voltage levels detected by the voltage detecting circuit 113, the turning-on pulse width during which the thermal printing head 104 is energized is set by the control unit 100 in accordance with the turning-on pulse width table 112.

Now, operation of the printing apparatus with the above structure will be described.

Figure 8:
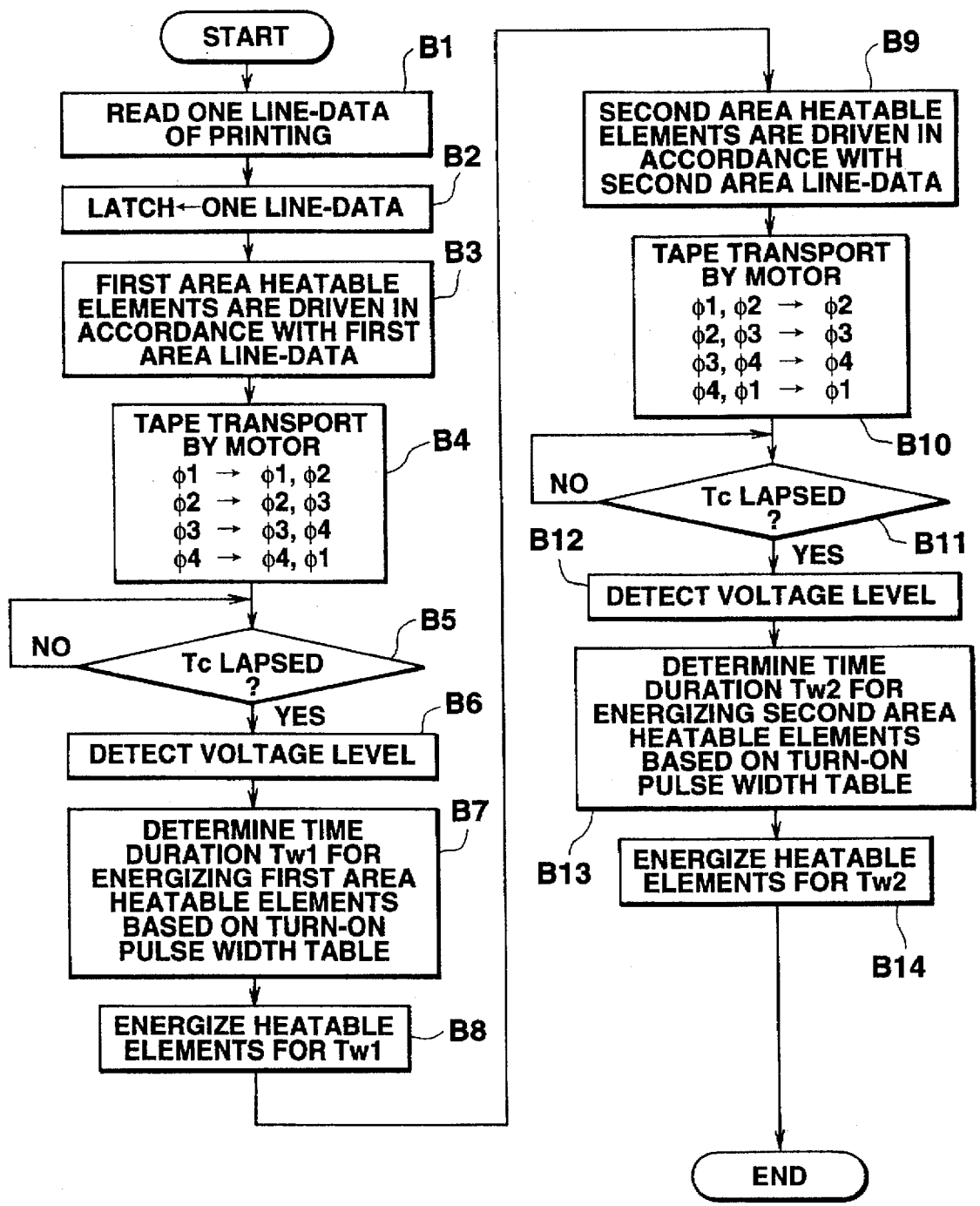
FIG. 8 is a flow chart of the separate-print process performed in the label printer of FIG. 7.

FIG. 8 is a flow chart of the separate printing process executed by the above printing apparatus.

Figure 9:
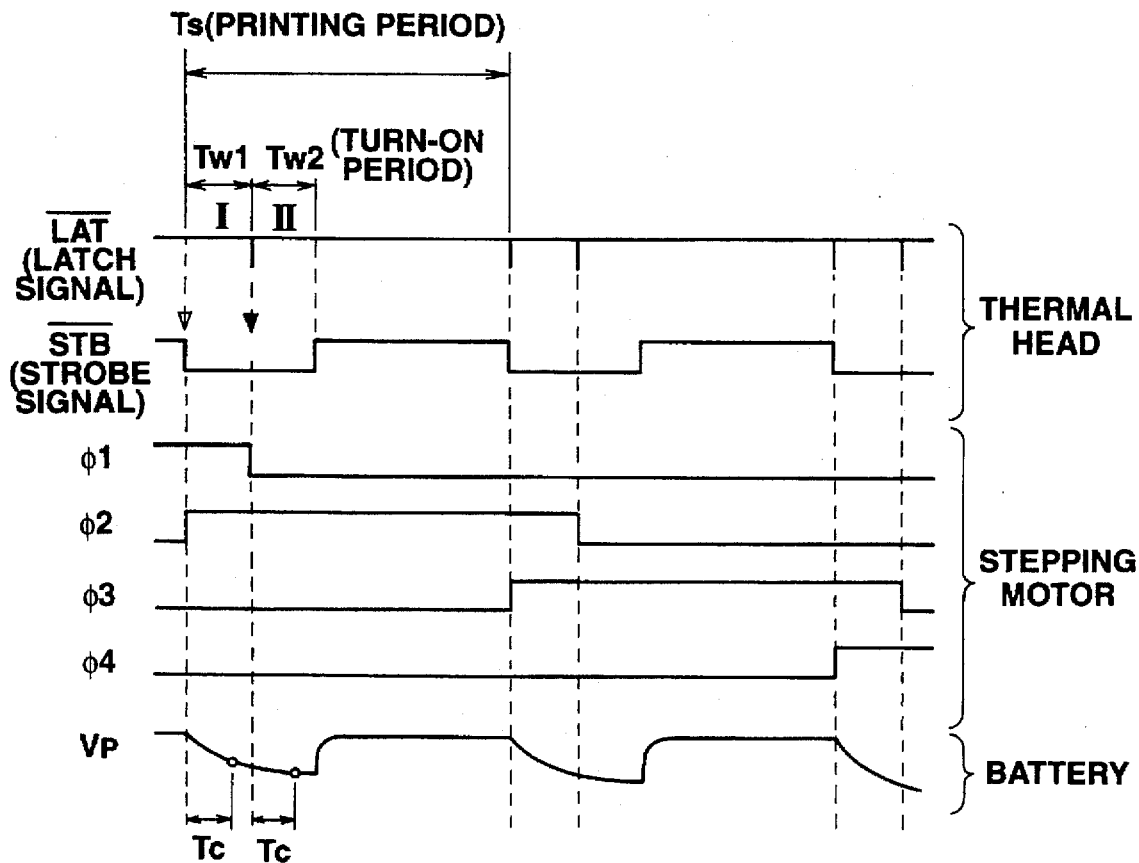
FIG. 9 is a timing chart illustrating a driven term of the thermal head and a driven term of a stepping motor in the separate-print process performed in the label printer.

FIG. 9 is a timing chart illustrating the energizing state of the thermal printing head 104 and the exciting state of the stepping motor 105 in the separate printing process of the above printing apparatus.

In a period Ts of printing the first printing line-data of the printing character data, the leading line-data of the printing data which has been input by the key input unit 101 and stored in the printing data memory 106 is read out by the control unit 100, and is memorized in the RAM 109, and further latched at the latch unit 115 of the thermal printing head 104 through the print control unit 103 (steps B1, B2).

Then, the first group of the heatable printing elements (the first to the third dot-heating elements) of the thermal printing head 104 are driven in accordance with the first separated-area printing data (3 dot data) of the first printing line-data latched at the latch unit 115 (step B3).

Figure 11:
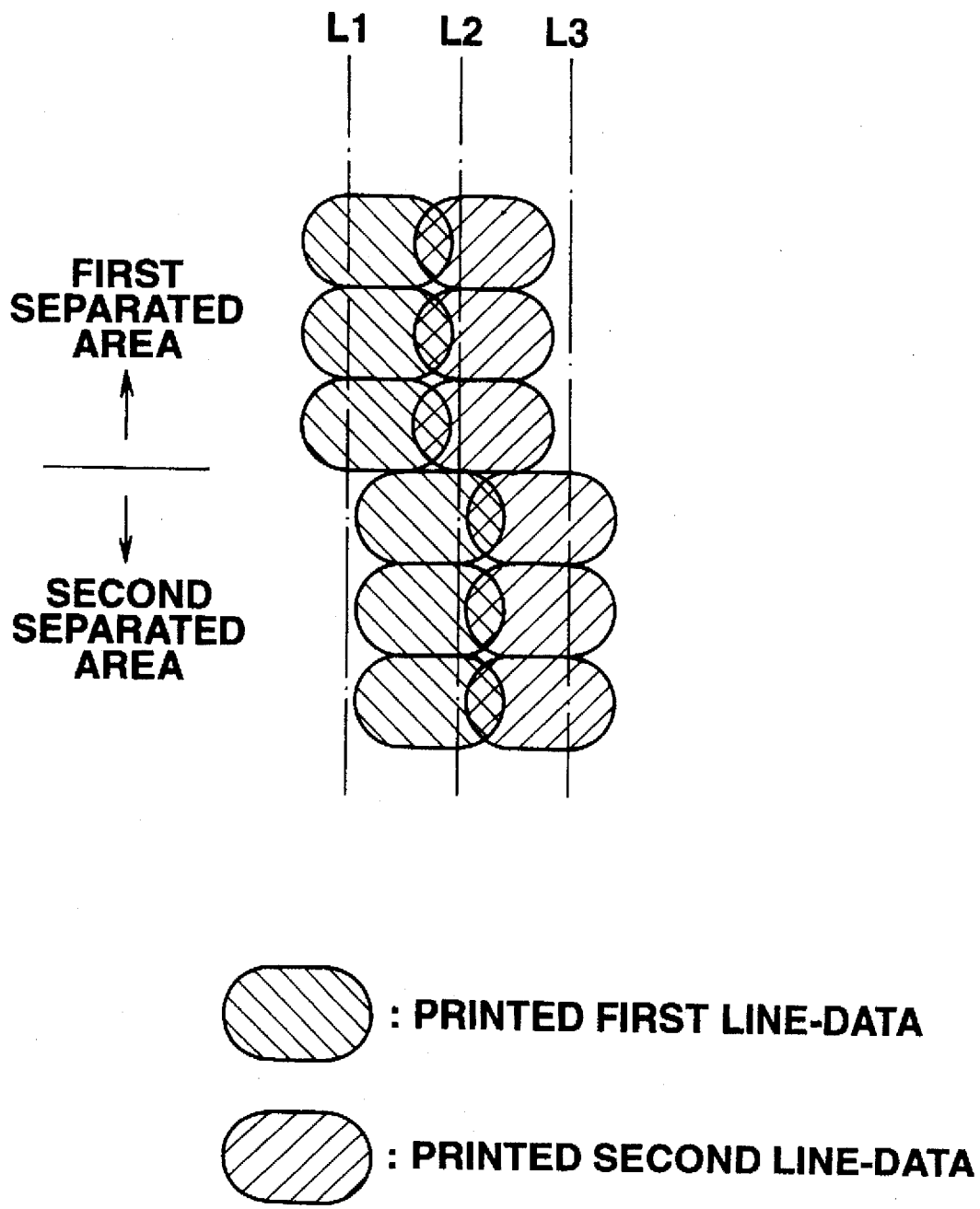
FIG. 11 is an enlarged view illustrating a printed resultant in the separate-print process performed in the label printer.

Meanwhile, in the stepping motor 105, the first-phase exciting electrode φ1 has been previously excited and a printing position on the label tape 114 is set at the first printing line L1, as shown in FIG. 11.

Further, the thermal printing head 104 is energized for printing the first separated-area printing data and then the first and second phase exciting electrodes φ1, φ2 of the stepping motor 105 are excited, too. The above exciting state is changed to "φ1" to "φ1 and φ2", thereby the label tape 114 is advanced by half a printing-line pitch, and the printing position on the label tape 114 is set to the intermediate position between the first printing line L1 and the second printing line L2 (step B4).

Then, the first separated-area printing data is printed on the label tape 114 from the first printing line L1 to the intermediate position between the first printing line L1 and the second printing lines L2.

When a predetermined time Tc (in this case, 1.5 ms) lapses after energizing the thermal printing head 104 for printing the first separated-area printing data, a voltage level Vp of the power source battery 110 is detected by the voltage detecting circuit 113, and sent to the control unit 100 (steps B5, B6).

Then, a turning-on pulse width TW1 of the turning-on pulse width table 112 for printing the first separated area printing data is determined in accordance with a voltage drop in the voltage level Vp of the power source battery 110 detected in the control unit 100. The first group of heatable printing elements of the thermal printing head 104 are driven for the time duration corresponding to the determined turning-on time setting data (steps B7, B8).

In case of a large drop in the voltage level Vp of the power source battery 110, a lowered driving voltage is supplied to the thermal printing head 1104, and thereby the first group of heatable printing elements generate heat at a low temperature not enough for the printing operation. Therefore, the turning-on pulse width TW1 of the turning-on pulse width table 112 is set to a time somewhat longer than a predetermined turning-on pulse width so as to obtain an evenly and clearly printed pattern.

When the first separated-area printing data of the first printing line-data of the printing character has been printed in the manner described above, the second group of heatable printing elements (the fourth to the sixth heatable printing elements) of the thermal printing head 104 are driven in accordance with the second separated-area printing data (3 dot data) of the first printing line-data latched at the latch unit 115 (step B9).

In this case, the exciting electrodes φ1 and φ2 of the stepping motor 105 are simultaneously excited, and a printing position on the label tape 114 is set at the intermediate position between the first printing line L1 and the second printing line L2, as shown in FIG. 11.

The second group of heatable printing elements of the thermal printing head 104 are driven and the first phase exciting electrode φ1 of the stepping motor 105 is subjected to a non-exciting state, and thereby the exciting state is changed from "φ1, φ2" to "φ2". Then, the label tape 114 is advanced by half a printing-line pitch, and the printing position on the label tape 114 is set at the second printing line L2 (step B10).

The above second separated-area printing data are printed on the label tape 114 from the intermediate position between the first printing line L1 and the second printing line L2 to the second printing line L2.

When a predetermined time Tc (=1.5 ms) lapses after energizing the thermal printing head 104 for printing the second separated-area printing data, a voltage level Vp of the power source battery 110 is detected by the voltage detecting circuit 113, and sent to the control unit 100, in a similar manner described above with respect to the printing the first printing data (steps B11, B12).

Then, a turning-on pulse width TW2 of the turning-on pulse width table 112 for printing the second separated-area printing data is determined in accordance with a voltage drop in the voltage level Vp of the power source battery 110 detected in the control unit 100. The second group of heatable printing elements of the thermal printing head 104 are driven for the time duration corresponding to the determined turning-on time setting data (steps B13, B14).

In a similar manner as described above with respect to the printing operation of printing the first separated-area printing data, in case of a large drop in the voltage level Vp of the power source battery 110, a lowered driving voltage is supplied to the thermal printing head 104, and thereby the second group of heatable printing elements generate heat at a low temperature not enough for the printing operation. Therefore, the turning-on pulse width TW2 of the turning-on pulse width table 112 is set to a time somewhat longer than a predetermined turning-on pulse width so as to obtain an evenly and clearly printed pattern.

When the printing process for printing the first printing line-data of the printing character data has been finished and the processes at steps B1 to B14 are repeatedly executed, the second and the third printing line-data are successively printed on the label tape 114 from the second printing line L2 and from the third printing line L3, respectively.

Figure 10:
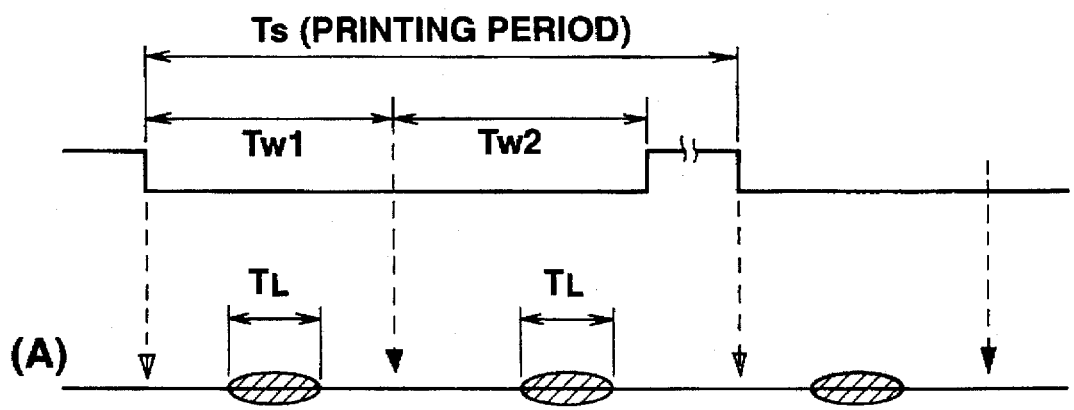
FIG. 10 is a view illustrating relationship between a driven term of the thermal head and tape feeding terms in the separate-print process performed in the label printer.

More specifically, as shown in at (A) in FIG. 10, the label tape 114 is advanced by a half of the printing line pitch in a time duration T1 within the turning-on pulse width TW1 for energizing the thermal printing head to print the first separated-area printing data of the printing line-data, and, further, the label tape 114 is advanced by another half of the printing line pitch in a time duration T1 within the turning-on pulse width TW2. Therefore, as shown in FIG. 11, the first and the second separated-area printing data (3 dot data and 3 dot data) are printed, by means of the heatable printing elements in the first and the second separated-areas, in elliptical patterns every a half line pitch respectively in a direction in which the label tape 114 is advanced, and the adjacent elliptical patterns are printed in a partially overlapping manner one another, leaving no non-printed portion on the label tape 114. As a result, an evenly printed resultant with high printing quality is realized In the above embodiment, the thermal printing head 104 employs 6 heatable printing elements arranged in a line, and these 6 elements are divided into two groups. The two groups of heatable printing elements are driven at different times for the printing operation. But the number of the heatable printing elements is not limited to six (6), and the heatable printing elements are not always divided into two groups but may be divided into more than two groups.

In the present label printer, the turning-on period during which the thermal printing head is to be energized is divided into two periods TW1 and TW2, and the label tape 114 is advanced by half a line pitch by the stepping motor 105. But the turning-on period may be divided by an arbitrary number, and the label tape 114 may be advanced by a length corresponding to a line pitch divided by the arbitrary number.

Third Embodiment

In the above second embodiment, the printing medium is transported by an even distance in a forward direction every time line-data in a separated area are printed. In a third embodiment, the printing medium is transported by an even distance alternatively in a forward and reverse directions when line-data in separated areas are printed.

The third embodiment of the label printer has the same structure as the second embodiment but the third embodiment is different from the second embodiment in control of the stepping motor.

Figure 12:
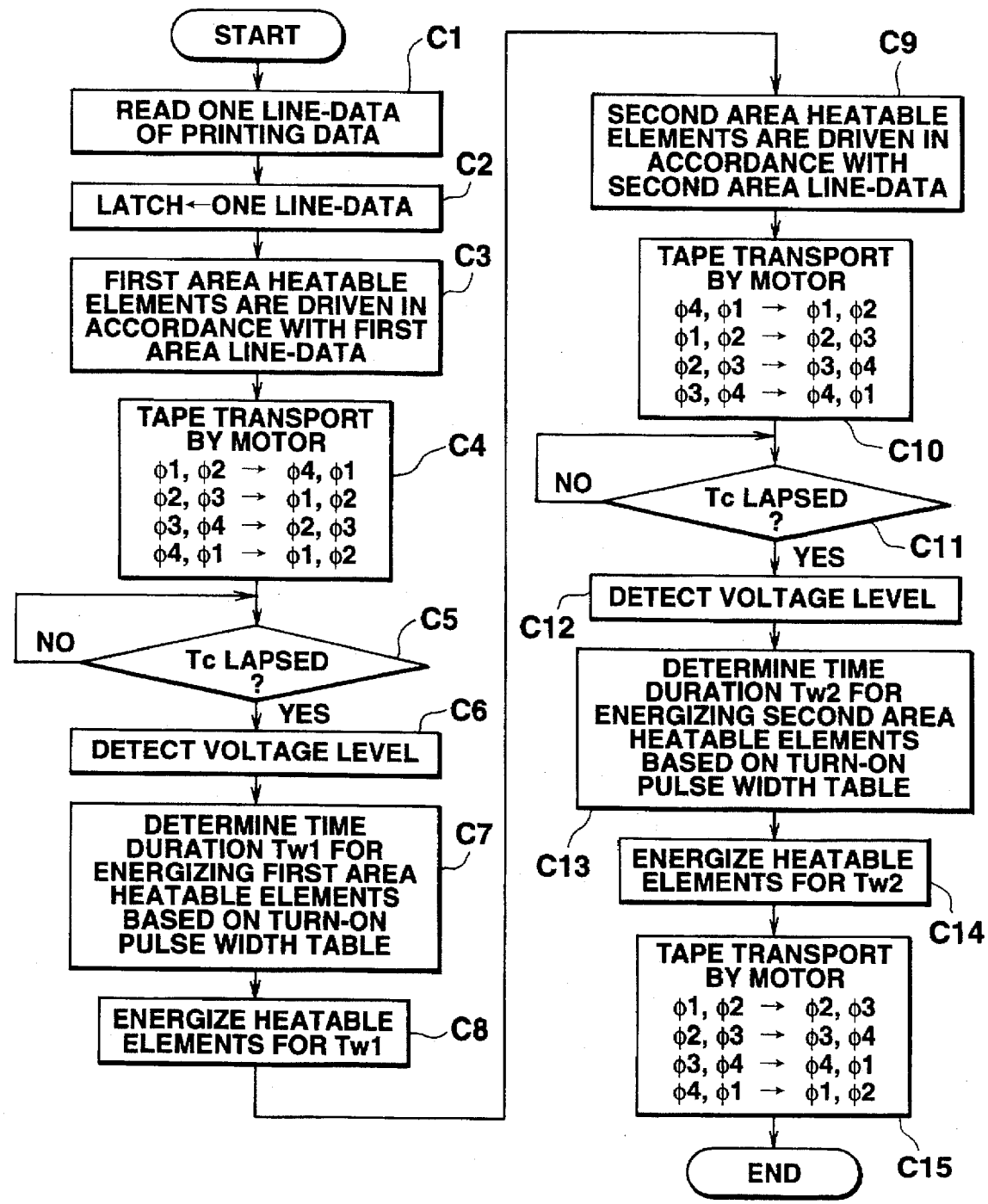
FIG. 12 is a flow chart of the separate-print process performed in still another embodiment of the label printer of FIG. 7.

FIG. 12 is a flow chart of a separated-area printing process in the third embodiment of the label printer. Since the label printer is different from the second embodiment of FIG. 8 in control of the stepping motor, the steps C4, C10 and an added step C15 of FIG. 12 are different from those of FIG. 8. These steps C1 to C3, C5 to C9, and C11 to C14 of FIG. 8 are the same as B1 to B3, B5 to B9, and B11 to B14 of FIG. 8, respectively.

Figure 13:
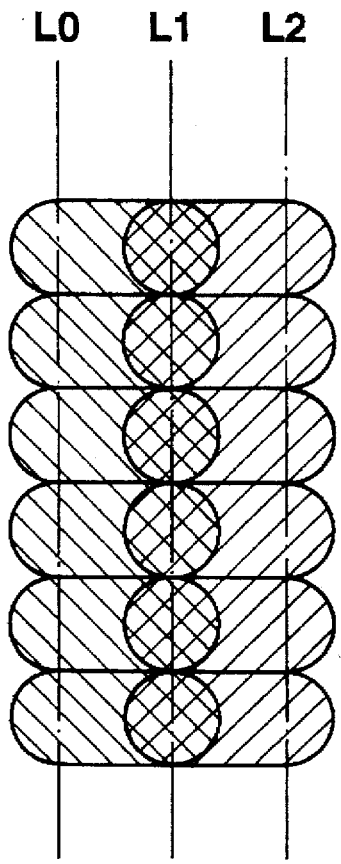
FIG. 13 is an enlarged view illustrating a printed resultant in the separate-print process performed in the label printer of FIG. 12.
Figure 13:
Figure 13:
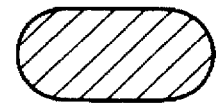
Figure 14:
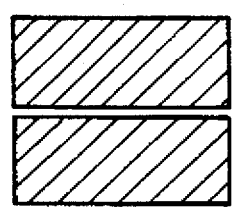
FIG. 14 is a view illustrating a first half driving area and a second driving area for heatable printing elements of a thermal head of a conventional label printer.
Figure 15:
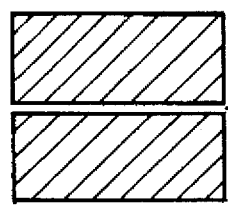
FIG. 15 is a view illustrating printing quality of a pattern to be painted black in the conventional label printer.
Figure 16:
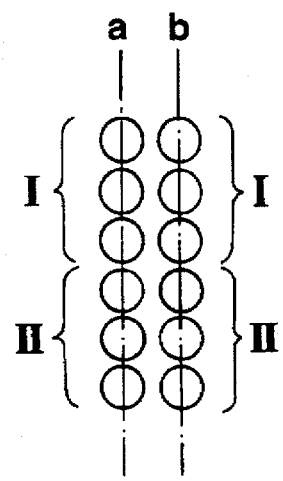
FIG. 16 is a view illustrating a first half driving area and a second driving area for heatable printing elements of a thermal head of a conventional label printer, a relation between the printing elements and tape feed.
Figure 17:
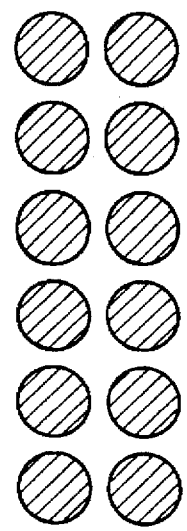
FIG. 17 is an enlarged view illustrating printed dots in the label printer of FIG. 16.

Let us assume that the first and the second phase exciting electrodes "φ1","φ2" of the stepping motor have been excited in step C4. Then, the fourth and first phase exciting electrodes "φ4", "φ1" of the stepping motor 105 are excited, and thereby the stepping motor rotates in a reverse direction and the label tape 114 is transported in a reverse direction by one line pitch. The label tape 114 is transported in the reverse direction while the heatable printing elements of the thermal head 104 are driven to print data in the first separated-area. Therefore, the printing data are printed on the label tape 114 one line pitch long. FIG. 13 is a view showing that printing data are printed on the label tape 114, i.e., printing data in the first separated area are printed from the printing line L1 to the printing line L0 in the reverse direction.

In step C10, the stepping motor 105 is controlled to rotate by one step in the forward or normal direction, i.e., the first and second phase exciting electrodes "φ1","φ2" are excited in place of the fourth and first phase electrodes "φ4", "φ1", thereby the label tape 114 is transported in the normal direction by one line pitch. Since the label tape 114 is transported in the normal direction while the heatable printing elements in the second separated area are being driven, the printing data is printed one line pitch long. As shown in FIG. 13, the printing data in the second separated-area are printed from the printing line L0 to the printing line L1.

In step C15, the label tape 114 is transported by one line pitch for printing the following one line-data, after one line-data have been printed. More specifically, the second and third phase exciting electrodes "φ2","φ3" are excited in place of the first and second phase exciting electrodes "φ1","φ2", and thereby the stepping motor 105 rotates in the normal direction by one line pitch. Then, the thermal head 104 stays on the printing line L2 as shown in FIG. 13.

In the above second embodiment, the first and the second phase exciting electrodes being excited, the stepping motor 105 rotates in the normal direction by a half of step, thereby transporting the label tape 114 by a half of line pitch. In the third embodiment, however, two phase exciting electrodes are excited and the stepping motor 105 rotates by one step in the normal or reverse direction, thereby transporting the label tape 114 by one line pitch.

As shown in FIG. 13, in the third embodiment, the first and the second separated-area printing data (3 dot data and 3 dot data) are printed, by means of the heatable printing elements in the first and the second separated-areas, in elliptical patterns respectively in a tape running direction, and the adjacent elliptical patterns are printed in a partially overlapping manner one another, leaving no non-printed portion on the label tape 114. In the third embodiment of the label printer, the printing data in the first and the second separated areas are printed in line with each other in the tape running direction. The third embodiment obtains the printed resultant with higher printing quality than the second embodiment.

What is claimed is:
1. A printing apparatus comprising:
a printing medium;
input means for inputting printing data which includes a plurality of line-data;
a thermal head having a plurality of heatable elements, for generating heat when driven, said heatable elements being disposed in a line and divided into plural groups;
printing means for successively driving the plural groups of heatable elements of said thermal head in accordance with the line-data of the printing data input by said input means, to print said line-data of the printing data on said printing medium; and
heat control means for driving a boundary heatable element within one group from said plural groups of heatable elements, along with another group from said plural groups of heatable elements immediately next to said boundary heatable element, in accordance with the line-data of the printing data input by said input means and on the same drive conditions as used for said another group of heatable elements, so as to generate heat when said another group of heatable elements are driven to generate heat.

2. A printing apparatus according to claim 1, wherein said heat control means controls a boundary heatable element disposed adjacently to the following group of heatable elements so as to generate heat when said following group of heatable elements are driven to generate heat.

3. A printing apparatus according to claim 1, wherein said heat control means controls a boundary heatable element disposed adjacently to the previous group of heatable elements so as to generate heat when said previous group of heatable elements are driven to generate heat.

4. A printing apparatus according to claim 1, wherein said heat control means comprises:
a memory for storing the line-data of the printing data input by said input means;
judging means for judging based on the line-data of the printing data stored in said memory whether the boundary heatable element is to be driven; and
control means for driving the boundary heatable element, when said judging means determines that the boundary heatable element is to be driven.

5. A printing apparatus according to claim 1, further comprising:
transport means for advancing said printing medium by a predetermined distance when said printing means has printed the line-data of the printing data input by said input means on said printing medium.

6. A printing apparatus according to claim 5, wherein said transport means comprises a stepping motor.

7. A printing apparatus according to claim 1, wherein said printing medium is a label tape.

8. A printing apparatus according to claim 1, further comprising:
an ink ribbon held on a surface of said printing medium, for thermal-transferring ink onto the surface of said printing medium to print thereon the printing data input by said input means, when said thermal head is driven to generate and apply heat to said ink ribbon.

9. A printing apparatus according to claim 1, further comprising:

a power source battery for applying driving power to said printing means and said transport means.

10. A printing apparatus comprising:

a printing medium;

input means for inputting printing data which includes a plurality of line-data;

a thermal head having a plurality of heatable elements, for generating heat when driven, said heatable elements being disposed in a line and divided into groups;

printing means for successively driving the groups of heatable elements of said thermal head in accordance with the line-data of the printing data input by said input means, to print said line-data of the printing data on said printing medium; and transport means for transporting said printing medium by a predetermined distance in one direction while said printing means is driving one of said groups of heatable elements of said thermal head, and transporting said printing medium by the predetermined distance in said one direction while said printing means is driving another of said groups of heatable elements of said thermal head, said predetermined distance corresponding to a quotient obtained by dividing one line pitch by the number of said groups of heatable elements and one line pitch corresponding to a distance between one of said plurality of line-data and adjacent line-data of the printing data.

11. A printing apparatus according to claim 10, wherein said transport means comprises a stepping motor.

12. A printing apparatus according to claim 10, wherein said printing medium is a label tape.

13. A printing apparatus according to claim 10, further comprising:

a power source battery for applying driving power to said printing means and said transport means.

14. A printing apparatus according to claim 13, further comprising:

voltage detecting means for detecting a voltage level of said power source battery;

time duration adjusting means for adjusting, based on the voltage level detected by said voltage detecting means, a time duration during which said printing means drives the heatable elements of said thermal head.

15. A printing apparatus according to claim 10, further comprising:

an ink ribbon held on a surface of said printing medium, for thermal-transferring ink onto the surface of said printing medium to print thereon the printing data input by said input means, when said thermal head is driven to generate and apply heat to said ink ribbon.

16. A printing apparatus according to claim 10, wherein said transport means transports said printing medium by a predetermined distance in one direction while said printing means is driving one group of heatable elements of said thermal head, and transports said printing medium by the predetermined distance in other direction while said printing means is driving other group of heatable elements of said thermal head.

17. A printing apparatus comprising:

a printing medium;

input means for inputting printing data which includes a plurality of line-data;

a thermal head having a plurality of heatable elements, for generating heat when driven, said heatable elements being disposed in a line and divided into groups;

printing means for successively driving the groups of heatable elements of said thermal head in accordance with the line-data of the printing data input by said input means, to print said line-data of the printing data on said printing medium;

transport means for transporting said printing medium by a predetermined distance in one direction while said printing means is driving one of said groups of heatable elements of said thermal head, and for transporting said printing medium by the predetermined distance in the other direction while said printing means is driving another group of heatable elements of said thermal head.

* * * * *